United States Patent Office 3,420,005
Patented Jan. 7, 1969

3,420,005
GRINDING APPARATUS FOR FORMING
CABOCHON SHAPED BODIES
Richard Edwin Moppett, 125 Prince Edward Ave.,
Earlwood, New South Wales, Australia
Filed Oct. 23, 1965, Ser. No. 503,283
Claims priority, application Australia, Dec. 23, 1964,
53,270/64
U.S. Cl. 51—121                                    6 Claims
Int. Cl. B24b 9/16

ABSTRACT OF THE DISCLOSURE

A grinding apparatus for shaping cabochons comprises a chuck adapted to be rotated and to grip a member which is to be formed into a cabochon so that it is held against the surface of a rotating grindstone. The chuck is mounted so that it can be swung in a plane perpendicular to the abrading surface of the grindstone. Means is provided for imposing on the chuck reciprocatory motion so that the cabochon is ground to a desired girdle shape around its periphery and is correspondingly shaped over its curved surface.

This invention relates to the forming of cabochon shaped bodies. Such bodies are referred to simply as cabochons hereinafter. The cabochon shape is frequently adopted for precious or semi-precious stones or the like in jewelry, and although not restricted thereto the present invention was devised primarily for the shaping of gem stones.

A cabochon cut stone is a non-faceted stone in the form of a smooth surfaced mound rising from a basal plane to a crown. The intersection of the mound surface and the basal plane is termed the girdle of the stone. For descriptive convenience the normal to the dome surface at the crown is termed the axis of the cabochon hereinafter. The axis is perpendicular to the basal plane and the axial distance from the crown to the basal plane is hereinafter termed the height of the cabochon. Frequently a cabochon shaped portion may be formed on a larger stone, in that event the basal plane may not coincide with an exposed surface of the stone. For example it is common to provide a parallel or tapered sided axial extension of the stone below the basal plane (in effect, providing a girdle of appreciable axial thickness).

Probably the most frequently adopted girdle shape is that of an ellipse, but pear shapes, cushion shapes and others are also well known. In the strict sense only cabochons in which the girdle is circular could be said to have a radial direction but for descriptive convenience any direction perpendicular to a cabochon's axis is referred to as a radial direction for that cabochon hereinafter irrespective of its girdle shape.

Hitherto cabochons have been shaped by hand by manipulating a rough stone against a grinding wheel. Such manual shaping has called for great skill on the part of the workman and has been both time consuming and expensive.

Accordingly the present invention was devised to enable cabochons to be shaped in a short time by a relatively unskilled operator.

The invention consists in grinding apparatus for shaping cabochons having; abrading means providing a substantially planar abrading surface; a rotatable chuck adapted to grip a workpiece so that it projects from the chuck in the direction of the chuck's axis of rotation; drive means to rotate the chuck and thereby to rotate a workpiece gripped by it about an axis corresponding to the axis of the finished cabochon; swing mounting means for said chuck such that it may be swung in a plane substantially perpendicular to the abrading surface about a swing axis intersecting the axis of the finished cabochon towards or away from a reference position in which the crown of the finished cabochon is in contact with the abrading surface; and girdle shape control means arranged to superimpose a further movement on the chuck, namely a reciprocatory movement of the chuck transversely of its axis of rotation in the plane in which it swings and with an amplitude of reciprocation which increases progressively as the angular departure of the chuck from the reference position increases.

The amplitude of the reciprocation is preferably zero when the chuck is at the reference position and although the amplitude increases as aforesaid it does not necessarily have a directly proportional relationship to the angle of departure. The reciprocation may be sinusoidal, that is to say a graph of displacement against time may be a sine wave; but that is a special and not particular useful case. In general the reciprocation would not be related to a sine wave but rather to other recurrent farily smooth wave forms. The mode of reciprocation determines the basic girdle shape.

It is preferred also to make provision for modifying the profile of the mound to render the cabochon's profile more or less "peaked" by comparison with a spherical profile. That modification is achieved by profile control means effective to vary the distance of the said swing axis from the abrading surface to an extent related to the extent that the chuck is swung from the reference position. That is to say the distance of the swing axis from the abrading surface is a predetermined function of the angle by which the chuck departs from reference position.

By way of example a preferred embodiment of the invention is described in more detail hereinafter.

The embodiment of the invention is illustrated in the accompanying drawings in which.

Figure 1:
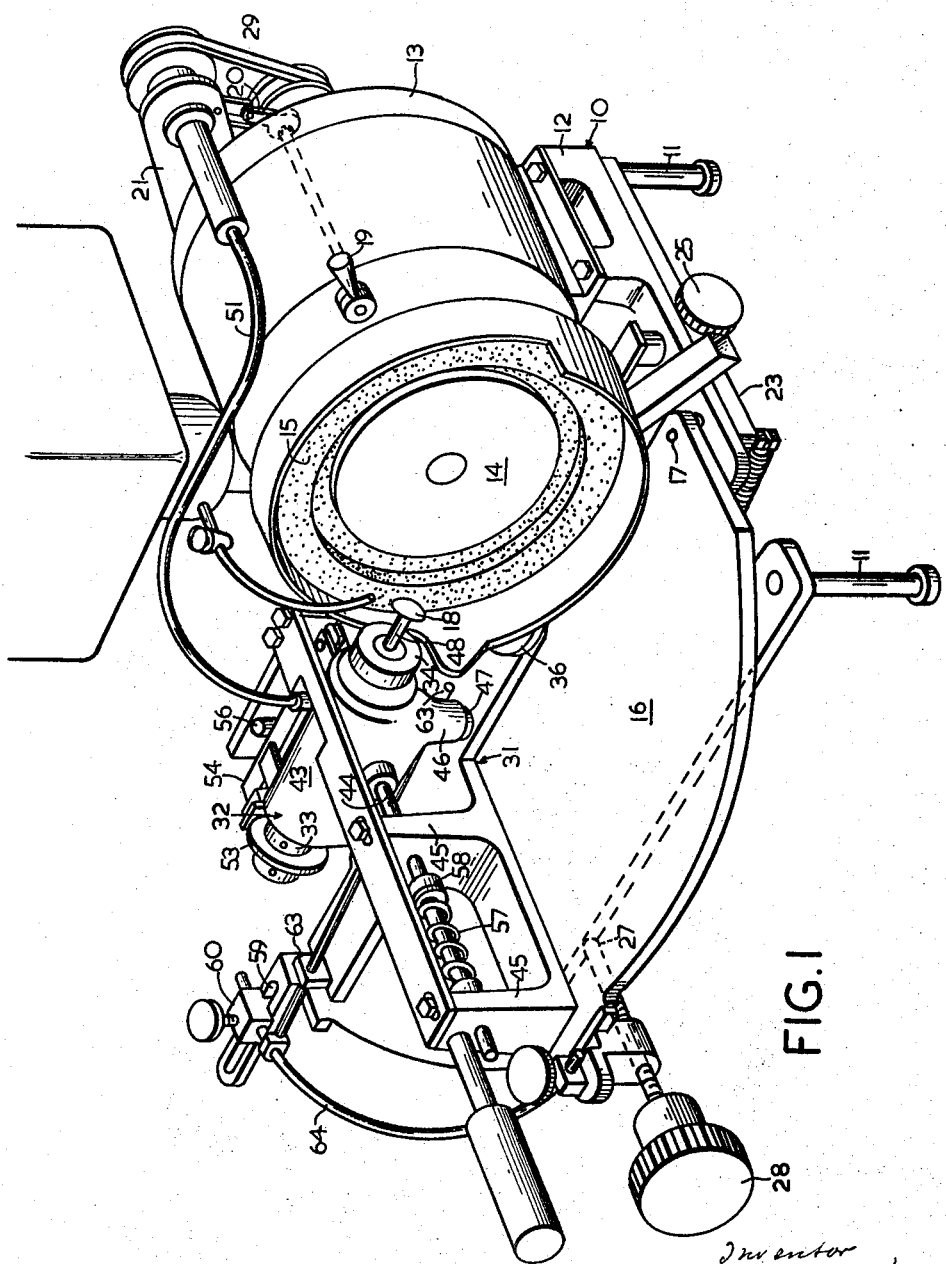
FIG. 1 is a perspective view of the grinding apparatus showing the grinding platform in its initial position.
Figure 2:
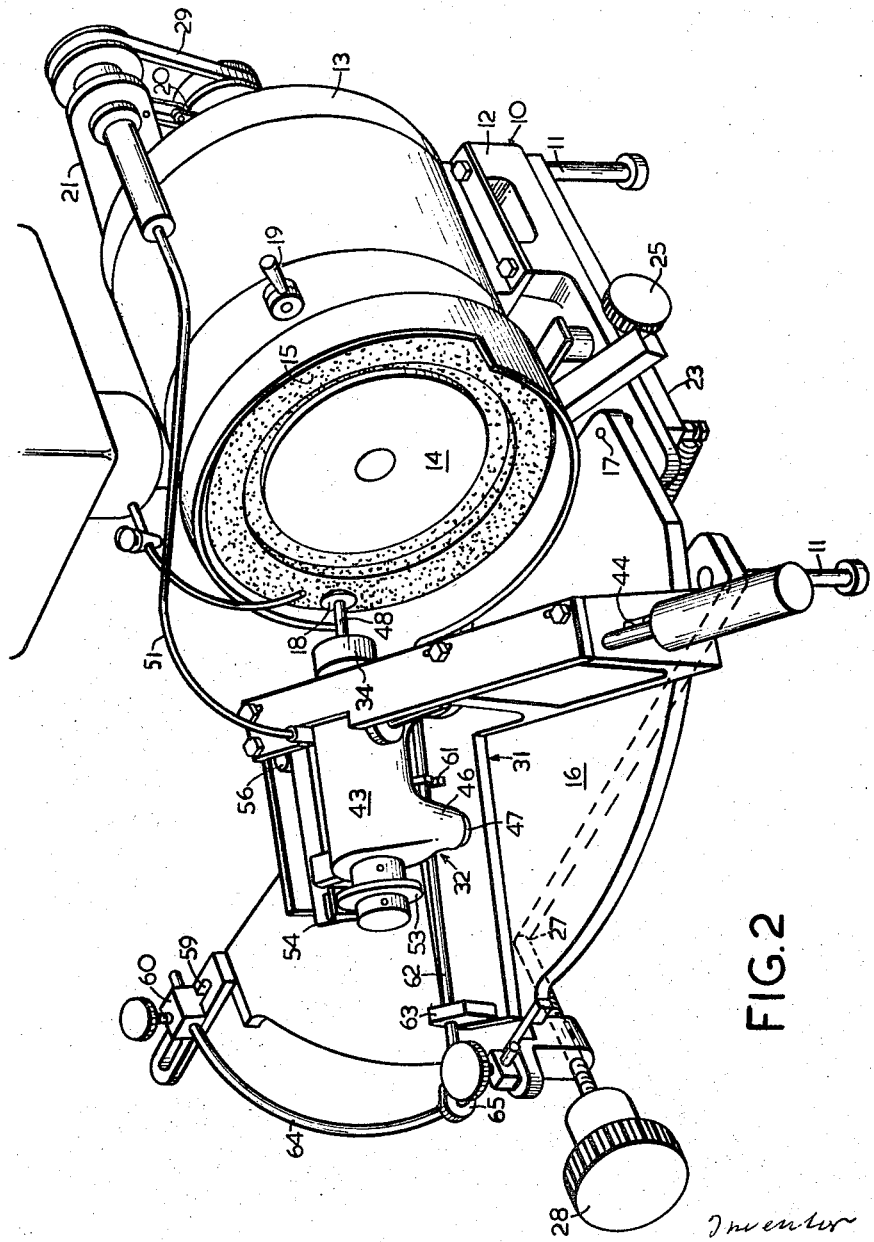
FIG. 2 is a similar view showing the platform moved around almost to its final position.
Figure 3:
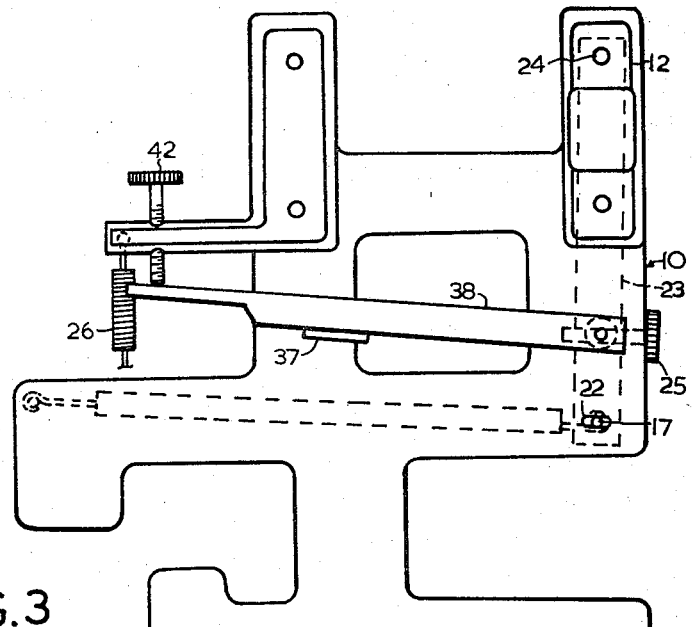
FIG. 3 is a plan view showing the base frame only of the grinding apparatus.
Figure 4:
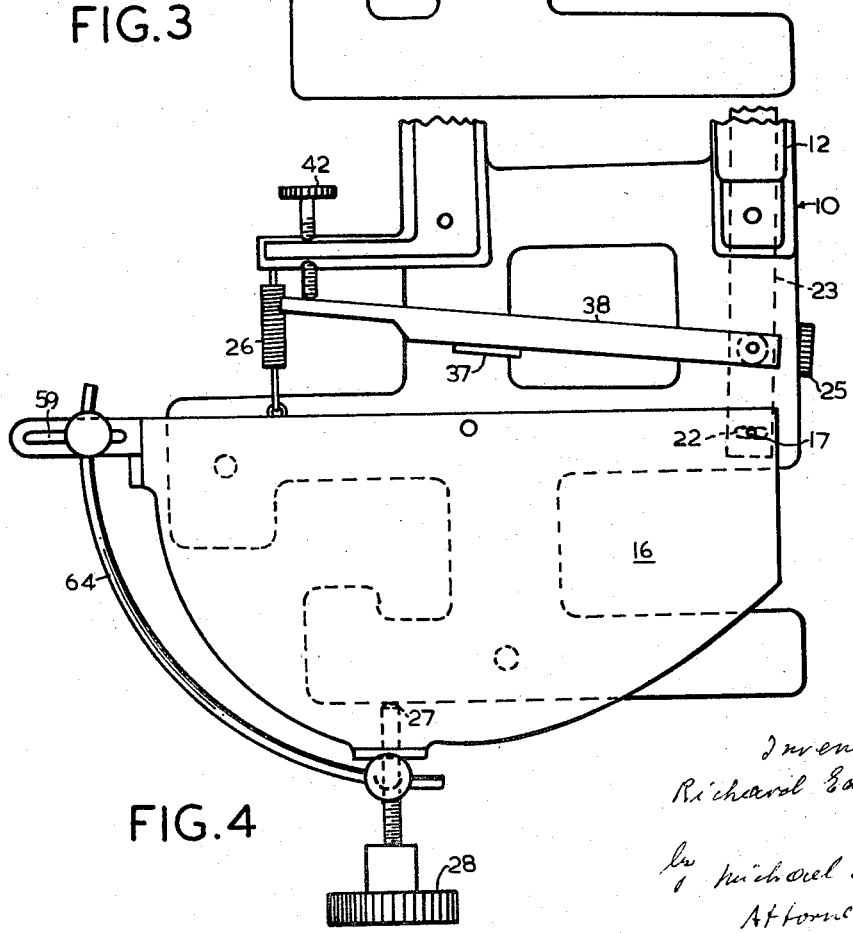
FIG. 4 is a plan view showing the adjustable supporting element mounted on the base.
Figure 5:
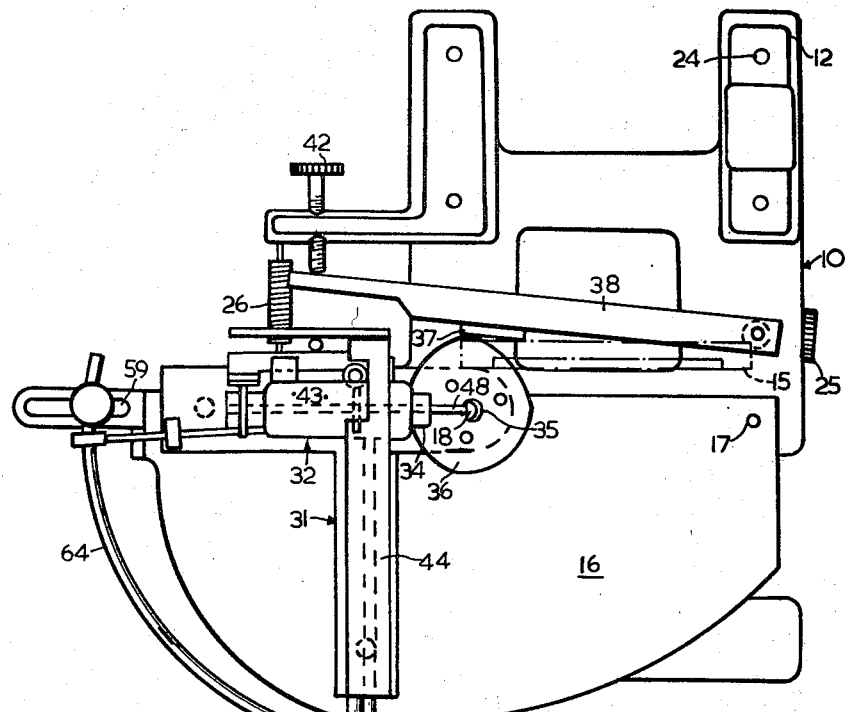
FIG. 5 is a plan view showing the horizontal platform mounted on the supporting element.
Figure 6:
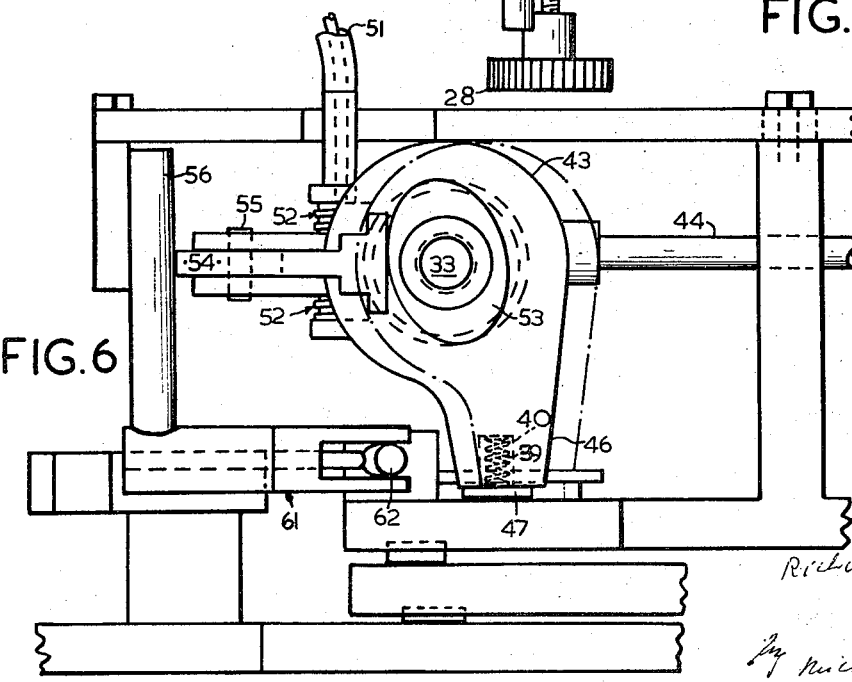
FIG. 6 is an enlarged end elevation of the chuck carrier showing the mechanism by which it is oscillated.
Figure 7:
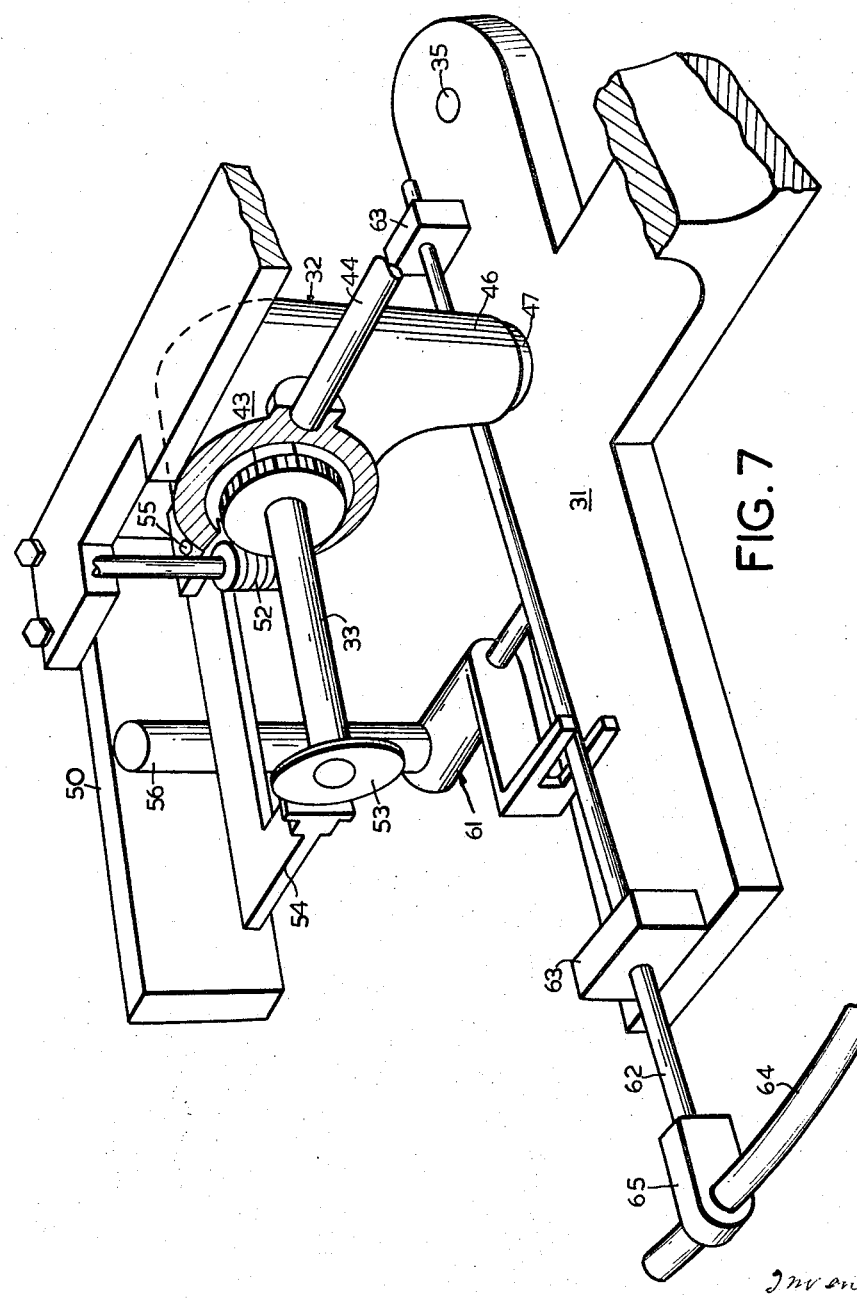
FIG. 7 is a fragmentary perspective view of chuck carrier reciprocating mechanism.

This embodiment comprises a bed 10 for the support of the apparatus as a whole. The bed 10 may be a metal casting.

The bed 10 has three or more downwardly directed feet 11 to rest upon a bench or other work-table. The bed has pedestals 12 for an electric motor 13 mounted thereon.

The motor 13 is positioned at the rear of the bed 10 which its output shaft horizontal and directed towards the front of the bed.

A grinding wheel 14 is mounted directly on the motor shaft. If gem-stones or other hard materials are to be worked the grinding wheel is preferably a so-called "diamond wheel," that is to say a wheel incorporating diamond particles as the cutting agent.

The flat end face 15 of the grinding wheel remote from the motor, or rather an annular zone thereof, constitutes the abrading surface.

A substantially horizontal platform 16 is pivotally mounted on the bed 10 in front of the grinding wheel 14. The pivotal mounting of the platform 16 enables it to swing about an upright axis disposed at one corner of the platform close to one side of the bed passing through the pivot pin 17. Thus slight pivotal movement of the platform causes it to approach or recede from the grinding wheel. Because of the distance between the platform pivot pin 17 and the working zone of the annular abrading surface (that is the zone of the abrading surface which is actually contacted by the work-piece 18) the motion of the platform 16 adjacent to said working zone approximates translational motion with reference to the working zone.

According to other examples of the invention not shown in the drawings, the platform is supported in guideways, or on guide rails or by other means permitting pure translational movement of the platform to or from the abrading surface.

The platform 16 is not pivoted directly on the bed 10 but rather is pivoted on a supporting element able to be positionally adjusted in a direction substantially transverse of the bed 10 (that is, in a direction perpendicular to the axis of rotation of the grinding wheel 14). Thus the platform pivot pin 17 on the platform extends downwardly through a slot 22 in the bed 10 into a platform pivot journal on or in a horizontal spring loaded carrier arm 23 below, and extending longitudinally of the bed 16; that carrier arm 23 being pivoted to the bed at one end at a point 24 and having the platform pivot pin journal at its other end. The position of the carrier arm 23 may be set by means of a carrier arm adjustment screw 25. The purpose of the transverse adjustment of the platform is to enable use to be made of the full width of the grinding wheel's cutting face.

The platform 16 is spring loaded towards the grinding wheel 14 by spring 26 and its rest position is determined by means of a platform abutment 27, which is a platform adjustment screw 28.

A swivel 31 is mounted on the platform 16 and in turn has a chuck carrier 32 mounted on it. The chuck carrier rotatably supports a chuck spindle 33 and the chuck 34 is on one end of that spindle. The spindle 33, of course, coincides with the chuck's axis of rotation and points directly at the working zone of the abrading surface 15 of the grinding wheel 14 when the chuck 34 is in the reference position.

In the example of the invention shown in the drawings the swivel 31 is a metal casting having the general shape in plan view of the letter T.

The swivel 31 is pivoted to the platform 16 by means of a downwardly directed swivel pivot pin 35 on the swivel projecting into a swivel pivot journal in the platform 16. The swivel pivot pin 35 is positioned near one end of the head portion of the swivel 31 (that is the portion corresponding to the head of the letter T), and the swivel pivot journal is positioned close to the grinding wheel 14 in alignment with the centre point of the working zone thereof.

The tip of the head portion of the swivel 31 at the grinding wheel end has a substantially horizontal, plate-like profile control cam 36 secured to it with a profile edge of the cam projecting beyond said tip into contact with a swivel abutment. Said swivel abutment is in the form of a vertical hardened steel plate 37 secured to a swivel abutment arm 38 extending transversely of the apparatus. The said swivel abutment arm 38 is pivoted at one end and is in contact with a stop screw 42 thereby providing for positional adjustment of the swivel abutment in, or substantially in, the axial direction of the apparatus.

When the swivel 31 is swung about its pivot 35 (to cause the chuck 34 to swing away from the reference position) the profile control cam 36 bears against the swivel abutment 37 and causes the platform 16, and therefore the chuck 34 mounted indirectly on it, to approach or recede from the grinding wheel so as to produce the required profile in the finished cabochon.

Preferably the profile control cam 36 is a multi-lobed cam and is secured to the swivel 31 by means providing for ready re-affixture of the cam to bring one or other of the lobes into the in use position depending on the profile desired for the cabochon.

The chuck carrier 32 of the example of the invention shown in the drawings comprises a spindle bearing block 43 pierced by the chuck spindle 33 and in which the chuck spindle may freely rotate and a guide-bar 44 projecting from the bearing block at right angles to the chuck spindle axis. The guide-bar 44 is fixed to the bearing block 43, and extends slidably through guide holes in each of a pair of upwardly projecting pillars 45 on the T leg portion of the swivel 31. The bearing block has legs 46 depending from it with nylon or other low friction feet 47 making sliding contact with the T head portion of the swivel. Thus the chuck carrier may slide to and fro in a direction perpendicular to the chuck spindle axis.

A coil spring 39 with a bore 40 in the chuck carrier 32 presses on the rear foot 47 and spring loads the assembly in a clockwise direction as seen in FIG. 1, thus taking up any unwanted play.

It will be appreciated that any other suitable mounting mechanism allowing the chuck carrier to slide as aforesaid may be used instead of said guide bar and pillars.

The chuck spindle 33 is axially located in the bearing block by suitable axial thrust faces or the like.

The chuck spindle 33 protrudes from the bearing block 43 at each end. The spindle end near the grinding wheel 14 has the chuck 34 secured to it. Usually, if a gem-stone is to be ground, it is adhered to one end of a metal rod 48 and it is that rod which is held by the chuck. Thus the chuck may be of simple construction, for example it may amount to no more than a collar on the spindle pierced by a grub screw adapted to grip the rod within the collar.

The chuck spindle is rotated by means of a so-called "flexible drive shaft" 51 (comprising a rotatable pliable core within a stationary pliable tubular sheath) extending from a driving motor 13 (which may be the same motor as that which turns the grinding wheel) to a driving gear 52 mounted on the bearing block in mesh with a gear on the chuck spindle. The said gears may be in the form of a worm and wheel—it then being the worm which is rotated by the flexible drive shaft. Preferably, the bearing block has a window or bite in it so that the said gears and adjacent portion of the spindle is exposed. Clearly any other suitable drive may be provided for the chuck.

A lever 19, which works a lever 20 is provided to enable the arm 21 to be pivoted, thus tightening or slackening the driving belt 29 to the flexible drive shaft 51. This enables the drive to the workpiece 18 to be engaged or disengaged at will.

Girdle shape control means are provided to control the shape of the girdle by superimposing a transverse reciprocating motion on the chuck carrier 32. Such girdle shape control means comprise a girdle shape control cam 53 on the protruding end of the chuck spindle remote from the chuck, a rocking cam follower lever 54 pivotally mounted at 55 on the bearing block 43 at one end and bearing against the girdle shape control cam 53 at its other end, and a movable amplitude control abutment 56 against which said follower lever bears at or near its other end, the abutment 56 being supported in any position by the fixed bar 50. The lever 54 is substantially parallel to the spindle 33 when it is on the lowest point of the girdle shape control cam and is disposed in a horizontal plane. The said amplitude control abutment 56 bears against the outer surface of the follower lever 54 and contact is then maintained between the abutment and the lever by means of a helical compression spring 57 sleeved upon the chuck carrier guide bar 44 and bearing at one end against one of said pillars 45 and at the other end against a collar 58 on the guide-bar.

As the chuck spindle 33 and therefore the girdle shape control cam 53 rotates, the follower lever 54 rocks and therefore causes the chuck carrier 32 to reciprocate transversely with an amplitude of reciprocation which depends upon the position of the movable amplitude control abutment 56. For instance, if the abutment 56 bears againts the follower lever 54 immediately adjacent to the lever's pivotal mounting 55 (and also if it makes substantially vertical line contact with the lever) the amplitude of the reciprocation is zero; but as the abutment is shifted along the follower lever towards or beyond the girdle shape control cam 53 the amplitude increases progressively to a maximum value.

The said amplitude control abutment may be an upwardly directed pin on a slide element 61 mounted on the swivel in a manner permitting it to move in a direction parallel to the chuck spindle. Means are provided to ensure that the position of the slide element 61 is related to the angle by which the swivel (and thus the axis of rotation of the chuck) departs from the reference position. The slide element 61 is secured to a pull rod 62 extending through pull rod bearings 63 on the swivel (which locate the pull rod beneath the spindle but permit axial movement of the pull rod) and slidably secured at one end to a curved rail 64 mounted on the platform 16. That rail is a curved rod and is detachably and adjustably secured to the platform 16 by the slider 60 movable along the slide 59 so that the rail path may be selected as required to vary the rate at which the pull rod 62 (and therefore the amplitude control abutment) moves as the swivel 31 is swung to one side about its pivot axis 35. The pull rod 62 is secured to the rail 64 by means of a slider 65 on the end of the rod 62 encircling the rail 64. It will be appreciated that other rail sections or cam grooves or other means may be used to shift the amplitude control abutment as required.

The shape of the girdle shape control cam 53 determines the basic girdle shape. For example, an elliptical cam will produce an elliptical girdle shape, although it will be appreciated that one elliptical cam will produce a great number of varying elliptical girdle shapes depending upon the curve and placement of the guide rail 64. Likewise, other shaped cams, for example cushion or pear shaped cams, are used for the girdle shape control cam to produce the corresponding girdle shapes—which again are modified by the placement and curvature of the guide rail 64.

When the apparatus described above is to be used, an operator may first insert the work piece in the chuck, select the lobe of the profile control cam which he wishes to use, set or adjust the position of the curved rail of the girdle shape control means, adjust the position of the platform abutment in accordance with the desired height of the cabochon, shift the platform into its rest position thereby grinding the crown of the cabochon and then swing the swivel to one side to complete the grinding of the cabochon.

The invention has been described above as applied to the initial shaping of a cabochon by grinding. However, it will be apparent that the use of a suitably fine abrading surface will allow cabochons to be polished by the apparatus of the invention and the terms grinding and shaping as used herein include polishing and like operations in their ambit.

The invention extends not only to the above described apparatus for shaping cabochons but also to the cabochons themselves when shaped by the apparatus.

What I claim is:

1. Grinding apparatus for shaping cabochons including abrading means providing a substantially planar abrading surface; a rotatable chuck adapted to grip a workpiece so that it protects from the chuck in the direction of the axis of rotation of the latter; drive means for rotating the chuck and for thereby rotating a workpiece gripped by it about an axis corresponding to the axis of the finished cabochon; swing mounting means mounting said chuck such that the latter may be swung in a plane substantially perpendicular to the abrading surface about a swing axis intersecting the axis of the finished cabochon, towards or away from a reference position in which the crown of the finished cabochon is in contact with the abrading surface; and shape control means arranged to superimpose a further movement on the chuck, comprising reciprocation of the chuck transversely of its axis of rotation in the plane in which it swings and with an amplitude which increases progressively as the angular departure of the chuck from the reference position increases, said shape control means including a carrier for the chuck reciprocable in a horizontal path at right angles to the axis of the chuck, a shape control cam mounted for rotation with and about the axis of the chuck, a rocking cam follower lever pivotally mounted on the chuck carrier against which cam follower the cam is spring urged, a movable amplitude control abutment against which the cam follower lever bears, means for moving the abutment along the length of the lever to vary the amplitude, and means for controlling the extent of movement along the length of the lever in relation to the extent that the chuck is swung from the reference position.

2. Grinding apparatus as claimed in claim 1 wherein the last mentioned means consist of a rod movable in the direction of its axis connected to the abutment, an end of the rod being slidably secured to a curved rail or curved cam track, the distance of the rail or track from the swing axis varying along its length whereby the said end of the rod is gradually moved towards the swing axis as the swing mounting means is swung towards the reference position.

3. Grinding apparatus as claimed in claim 2 wherein said curved rail is mounted so that one end thereof is movable towards and away from the swing axis.

4. A grinding apparatus, particularly for grinding cabochons, comprising, in combination, abrading means providing a substantially planar abrading surface located in a plane; a chuck adapted to grip a workpiece and being rotatable about an axis of rotation; swivel means mounting said chuck for swivel movement about a swivel axis spaced from said plane and normal to said axis of rotation between a first position and a series of second positions in which said axis of rotation respectively parallels said plane and is inclined with reference to the same at increasing angles; shape-control means cooperating with said chuck and operative for imparting to the same in a direction normal to said swivel axis a reciprocatory movement having an amplitude which increases as a function of the increasing angle of inclination of said axis of rotation with reference to said plane and during movement of said chuck from said first to said second positions; and profile control means operative for varying the spacing of said swivel axis from said plane as a function of movement of said chuck about said swivel axis between said first and second positions.

5. A grinding apparatus as defined in claim 4, wherein said abrading means comprises a rotary member having said abrading surface provided thereon.

6. A grinding apparatus as defined in claim 5, wherein said rotary member is a diamond wheel.

References Cited

UNITED STATES PATENTS

| | | | |
|---|---|---|---|
| 457,866 | 8/1891 | Messaz | 51—124 |
| 1,231,920 | 7/1917 | Lumsden | 51—127 X |
| 2,291,000 | 7/1942 | Simpson | 51—127 X |
| 2,454,472 | 11/1948 | Monkley | 51—124 X |

HAROLD D. WHITEHEAD, *Primary Examiner.*

U.S. Cl. X.R.

51—124, 230